United States Patent [19]
Welteroth

[11] 3,992,177
[45] Nov. 16, 1976

[54] MULTI-ACTION PARTICLE SEPARATOR

[76] Inventor: Carl Welteroth, 123 Bay Ave., Highlands, N.J. 07732

[22] Filed: May 28, 1975

[21] Appl. No.: 581,506

[52] U.S. Cl. ................... 55/288; 55/304; 55/319; 55/324; 55/326; 55/328; 55/335; 55/337; 55/341 NT; 55/378; 55/432; 55/439; 55/440; 55/447; 55/475; 55/481; 55/498; 55/508; 55/510

[51] Int. Cl.² .................................. B01D 50/00
[58] Field of Search ............ 55/272, 288, 300, 304, 55/318–321, 324, 325, 334, 335, 337, 341, 343, 432, 440, 439, 464, 465, 481, 447, 475, 498, 508, 510, 326, 328, 378

[56] References Cited
UNITED STATES PATENTS

| | | | |
|---|---|---|---|
| 407,598 | 7/1889 | Kutsche | 55/459 A |
| 1,341,129 | 5/1920 | Hopkins | 55/304 X |
| 1,458,720 | 6/1923 | Malone | 55/337 X |
| 1,601,148 | 9/1926 | Ruemelin | 55/325 X |
| 1,781,430 | 11/1930 | Blaney | 55/324 X |
| 2,167,236 | 7/1939 | Gieseler | 55/304 |
| 2,308,365 | 1/1943 | Hornbrook | 55/319 X |
| 2,335,315 | 11/1943 | Seymour | 55/341 |
| 2,829,735 | 4/1958 | Kroll | 55/304 X |
| 2,845,140 | 7/1958 | Luhr | 55/496 X |
| 2,890,929 | 6/1959 | Rummert | 55/459 A X |
| 3,378,994 | 4/1968 | Farr | 55/324 |
| 3,639,940 | 2/1972 | Carlson et al. | 55/304 X |
| 3,651,621 | 3/1972 | Davis | 55/319 X |
| 3,710,559 | 1/1973 | Harris et al. | 55/341 |
| 3,733,790 | 5/1973 | Pierce | 55/334 X |
| 3,805,494 | 4/1974 | Kroll | 55/304 X |

FOREIGN PATENTS OR APPLICATIONS

| | | | |
|---|---|---|---|
| 1,096,914 | 6/1955 | France | 55/272 |
| 868,286 | 12/1941 | France | 55/304 |
| 738,305 | 12/1932 | France | 55/300 |

Primary Examiner—Frank W. Lutter
Assistant Examiner—Kathleen J. Prunner
Attorney, Agent, or Firm—Sughrue, Rothwell, Mion, Zinn and MacPeak

[57] ABSTRACT

A vertically oriented, sheet metal enclosure includes a frusto-pyramidal lower section forming a hopper for separated particulate matter from an air stream which enters a middle section from a downwardly and inwardly inclined inlet duct fixed to one side of that section at the upper end, causing impingement of the airborne particles against the side of the hopper to effect a swirling action to the air stream. An array of laterally spaced, inclined baffle plates at the upper end of the middle section separates the middle section from an upper section which carries tensioned tubular filter bags. An enclosure cover defines an outlet opening feeding to a cover mounted blower.

7 Claims, 7 Drawing Figures

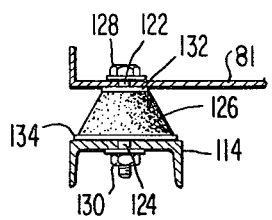
FIG.3
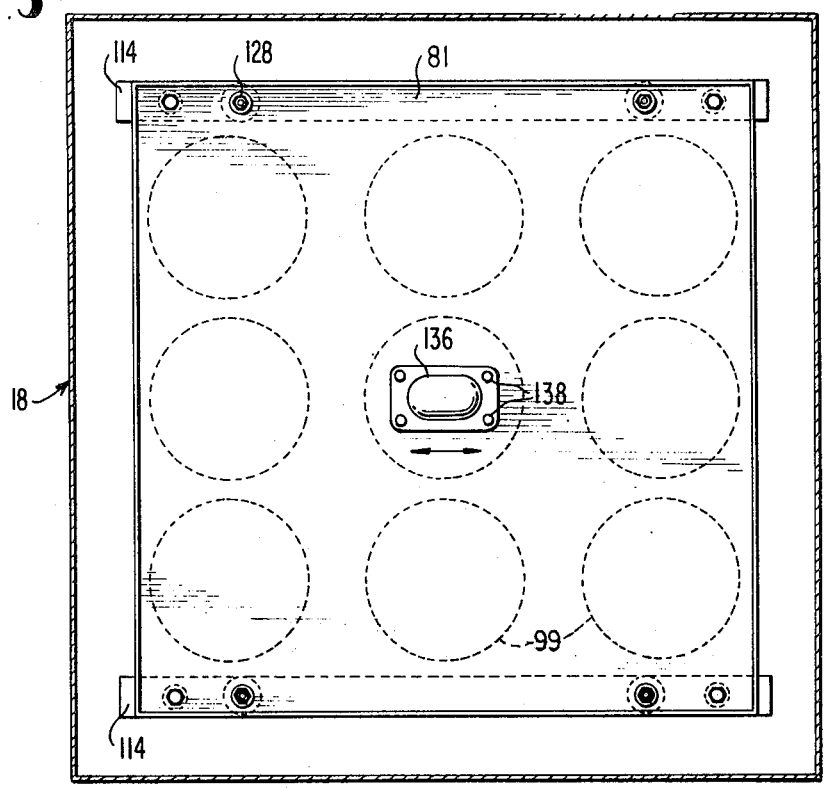
FIG.5
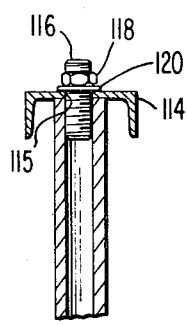
FIG.6
FIG.4
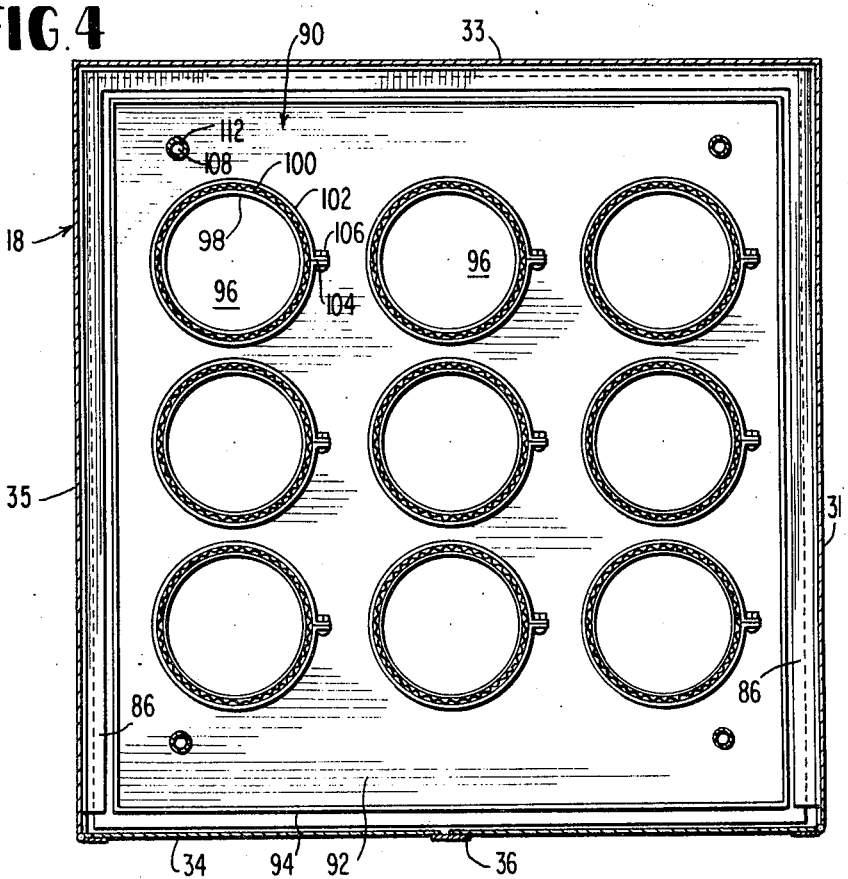
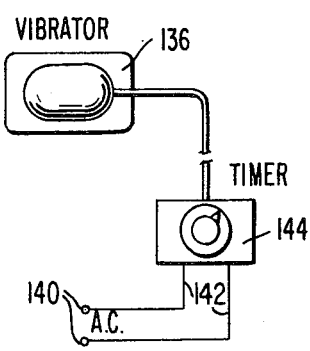
FIG.7

MULTI-ACTION PARTICLE SEPARATOR

BACKGROUND OF THE INVENTION

1. Field of the Invention

This invention relates to the separation of airborne particles, either liquid or solid from a gas stream, and more particularly, to a combined gravity, vortex, impingement and filter bag action, compact separator.

2. Description of the Prior Art

Dust collectors and other particle separators have long employed the principles of reduced velocity flow and vortex action, to effect gravity separation and centrifugal force separation of particles carried by a moving air stream. Further, baffles or other obstructions to the flow of air to cause impingement separation of the airborne particles have been employed. Further, particle separation of small particles as well as large particles has been effected by the employment of tubular filter bags having a mesh size determined by the size of the particles to be separated, and the degree of particle separation required for the individual applications to which the separators have been put.

Some attempts have been made to incorporate multiple separation techniques into a single apparatus which performs jointly the different separation processes. Such multi-action particle separators have been characterized by complexity of design, separation inefficiency and clogging of the various separation device components forming the overall assembly. Further, while the enclosures for the various separation components have incorporated doors or removable panels permitting access to the interior of the apparatus, particularly where the separator employs a plurality of tubular filter bags, it has been necessary in the past to remove the individual filter bags after clogging. In situations where there is a change in the particle content such as in removing fine paint particles from the atmosphere attendant to paint spray booths and the like, the individual filter bags are changed for each different paint color. Further, the clogging of the filter bag separation components results in the prevention of air flow to the other separation components, and therefore, requires the complete shut down of the separator itself, even though the other separation components may be capable of adequately performing particle separation prior to or after the air stream reaches the filter bag separation component.

SUMMARY OF THE INVENTION

The present invention is directed to an improved multiaction particle separator which comprises an elongated, vertically oriented sheet metal enclosure forming an upper filter bag, micron particle separator section, a middle gravity and particle impact separation section, and a lower vortex separation and particle settling hopper section. The enclosure includes a horizontal cover which overlies the top of the enclosure and a horizontal gate to close off the hopper discharge opening at the bottom of the hopper. Inclined inlet conduit means fixed to the side of the enclosure opens downwardly and inwardly into the middle section at the upper end thereof to cause the air to impact the opposite inclined wall of the lower hopper section and a vortex action of the incoming air and suspended particles occurs within the lower hopper section to remove some of the particles by centrifugal force. A plurality of laterally spaced, baffle plates span the top of the middle section, with the plates being inclined generally parallel to the axis of the inlet duct. Preferably, the baffle plate adjacent the inlet duct opening into the side wall of the enclosure is elongated and extends downwardly beyond the lower end of the other baffle plates to assist in effecting a vortex action to the incoming air and particle mixture within the hopper section. The baffle plates are generally inclined and at right angles to the flow of air leaving the hopper section and passing through the middle section into the upper section. A plurality of vertical, parallel, spaced tubular filter bags are mounted within the upper enclosure section and open interiorly to the middle section and are closed off at their upper ends. The space between the tubular filter bags, within the upper section, is open to a discharge duct extending into the enclosure cover at the center thereof, the duct carrying a cover mounted blower for inducing air flow through the separator from the inlet duct. The particle separator causes particles to separate from the air by vortex action within the hopper, gravity separation by air velocity reduction and by particle impingement on the baffle within the middle section, and dust bag filtering of micron size particles within the upper section, prior to air discharge.

Preferably, the enclosure is formed of sheet metal detachable sections to permit modularization of the separator and to allow an increase in length of any one of the three sections, depending upon the particle load and size of the air stream. The blower, which is preferably mounted on the cover, sucks the particle contaminated air through the enclosure to reduce the adverse effect of particle contact with the blower components.

Preferably, the filter bags are carried by a replaceable and exchangeable filter bag assembly comprising vertically spaced upper and lower plates with circular collars on respective plates forming aligned bag mounting rings on respective plates. The filter bags are in tubular form and have respective ends surrounding and concentrically mounted on said collars and held by ring clamps. Pipes carried by one plate at the corners thereof terminates in threaded rods extending through the other plate, whereby, rotation of the threaded rod and pipe causes one plate to move away from the other to tension the tubular filter bags therebetween. Paired tracks fixed to the enclosure receive respective lateral edges of one of the plates to slidably mount the filter bag assembly within the upper enclosure section. Access doors within the side of the enclosure permit access to the interior of the upper section for permitting the filter bag assembly to be removed and exchanged.

Means are provided for periodically mechanically vibrating one plate with respect to the other to cause the micron sized particles attached to the surface of the tubular filter bags to be dislodged and fall by gravity through the middle section and into the hopper. Preferably, the upper plate carries the mechanical vibrator and the pipe and rod couplings adjustably mounted to the lower plate are rotatably mounted at their upper ends to plate support bars on respecitve sides of the plate. Resilient damping elements are fixedly mounted between the upper plate and the support bars and permit limited oscillation of the upper plate by the vibrator to facilitate loosening and gravity fall of the particles deposited on the filter bag material, during air passage therethrough.

BRIEF DESCRIPTION OF THE DRAWINGS

FIG. 3 is a sectional view of the particle separator of FIG. 2 taken about line 3—3.

FIG. 4 is a sectional view of the particle separator of FIG. 2 taken about line 4—4.

FIG. 5 is a fragmentary sectional view of a portion of the removable filter bag assembly illustrating the resilient support of the upper bag support plates.

FIG. 6 is a sectional view of the tensioning mechanism for the filter bags of the filter bag assembly.

FIG. 7 is an electrical circuit diagram for the vibrator associated with the removable filter bag assembly.

DESCRIPTION OF THE PREFERRED EMBODIMENT

Figure 1:
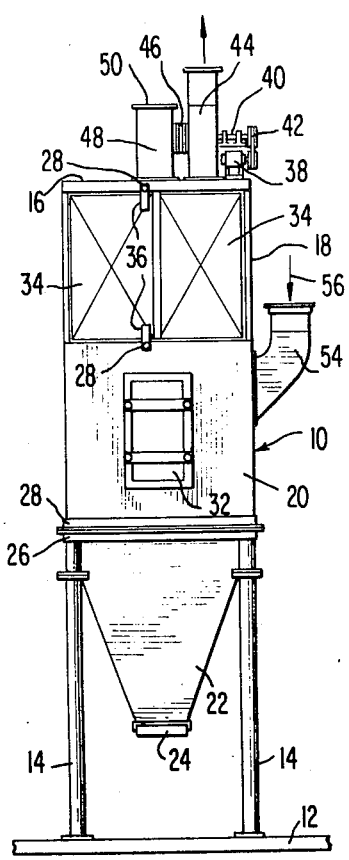
FIG. 1 is a side elevational view of the improved multi-action particle separator of the present invention in a preferred form.

Referring to the drawings, a preferred embodiment of the invention of the multi-action particle separator comprises a generally rectangular enclosure 10 formed of sheet metal and being mounted to the ground or floor 12 by way of four vertical posts 14 such that the enclosure 10 is supported vertically, being closed off at its upper end by a cover or top 16. The enclosure 10 is elongated vertically and comprises three separator sections: an upper section indicated generally at 18, a middle section indicated generally at 20, and a lower hopper section 22, the hopper section 22 being in the form of an inverted frusto-pyramid and including a sliding hopper gate 24 mounted on a trackway for moving horizontally to permit the discharge of accumulated separated particles from the hopper section 22 after use of the separator.

Figure 2:
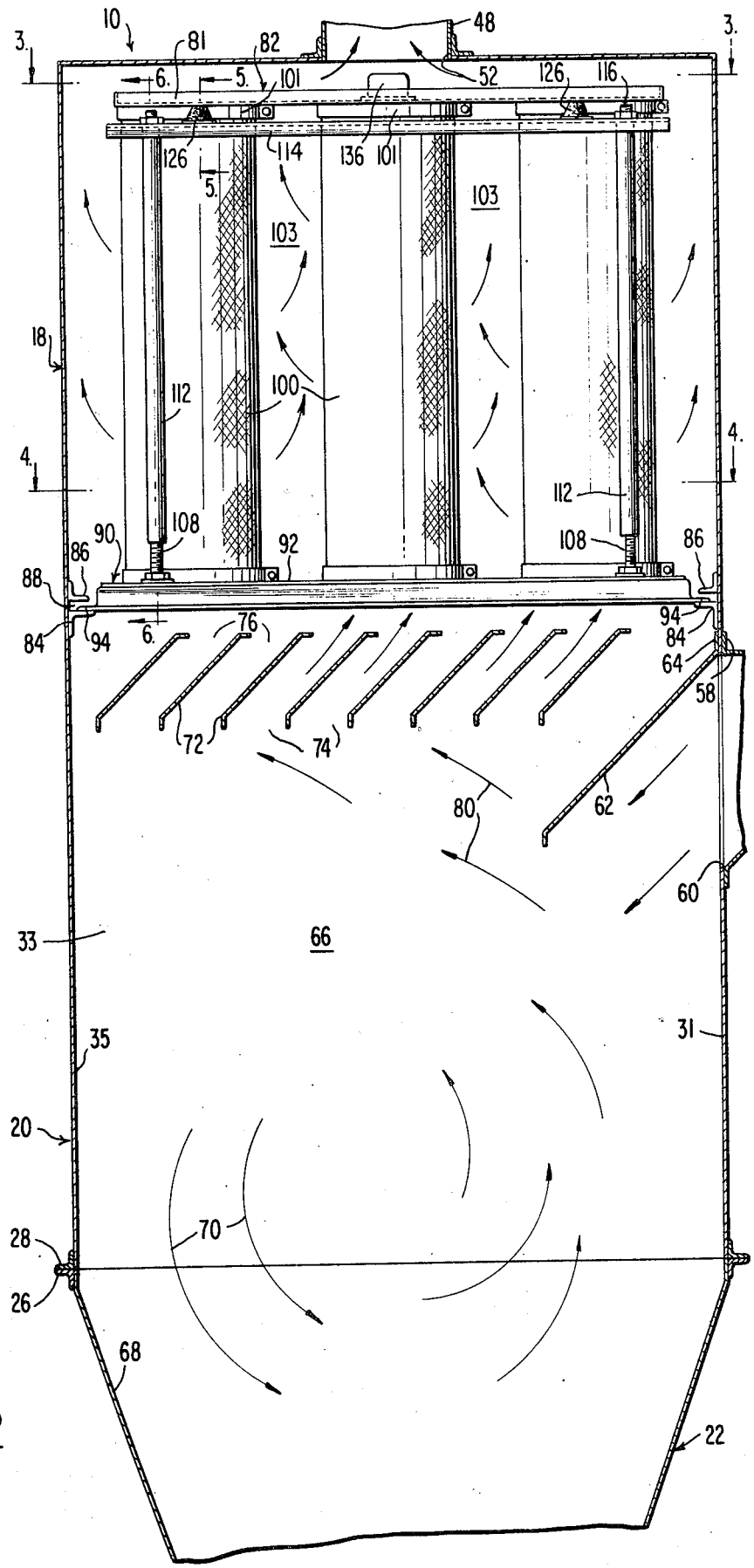
FIG. 2 is a sectional, elevational view of a portion of the particle separator of FIG. 1.

The enclosure 10 may be unitary but preferably, as shown, has one or more of the sections 18, 20 and 22 separate from the others. In the illustrated embodiment, FIG. 1, hopper section 22 terminates at its upper end in flanges 26, while the lower end of the middle section 20 is provided with similar flanges 28 about the outer edge thereof. The flanges may be bolted or otherwise mechanically coupled together by means (not shown). The upper end of the hopper 22 conforms in size and configuration to the sidewalls of the middle section 20 and opens directly into the middle section 20. As evidenced in FIG. 1, the sidewall of the middle section is provided with a removable access door 32 permitting access to the interior. Further, with respect to the upper section 18, a pair of access doors 34 are provided which may be opened by rotation of door latches 36 about pivot pins 28 with the doors 34 being swung open, and away from each other on hinges (not shown) to permit access to the interior of the upper section of the enclosure 10. In the illustrated embodiment, the top or cover 16 is of sufficient strength to support a blower motor 38, a blower drive shaft 40, and a belt and pulley drive system 42 which drives a blower (not shown) within blower housing 44 to the side of the motor 38. A lateral duct 46 connects the blower housing 44 to the separator discharge duct 48 which is closed off at its upper end at 50 and its lower end open as shown in FIG. 2 directly into the interior of the upper enclosure section 18 by way of a circular opening 52 within the cover or top 16 of the enclosure. The opening 52 and the discharge duct 48 are located centrally of the upper enclosure section 18.

The contaminated air enters the particle separator by means of a contoured inlet duct or conduit means 54 which receives the incoming air as shown by the arrow 56, the duct 54 having its section which directly connects to the side 31 of the enclosure section 20, downwardly inclined. The contoured inlet duct 54 is welded or otherwise affixed by way of flange 58 to the sidewall 31 of the middle section of the enclosure aligned with the opening 60 within this sidewall. Further, on the interior of the same wall 31 is mounted a downwardly and inwardly directed deflector or baffle plate 62, this plate having a flanged end 64 mounted to the wall adjacent the upper end of opening 60. The plate extends inwardly a distance almost to the center of the chamber 66 formed by the enclosure section 20 and cooperates with the inclined contoured inlet duct 54 such that the incoming air carrying the particles is directed downwardly and against the hopper sidewall 68 on the side of the separator enclosure opposite that of the sidewall 31 of the middle enclosure section. The chamber 66 has a horizontal cross-sectional area which is approximately ten times as large as the cross-section of the contoured inlet duct 54 such that the air velocity decreases within the chamber 66 by a factor of approximately ten, this velocity being insufficient to maintain the larger particles suspended, which particles tend to fall into the hopper section 22 by gravity action.

Further, the downward inclined flow of air and impingement of that air against the interior of the hopper sidewall 68 causes a vortex or cyclonic action as shown by arrows 70 to be set up within the hopper section 22 and the lower end of the middle separator section 20. Thus, centrifugal force further acts to separate suspended particles from the air stream. A plurality of relatively short length, inclined baffle plates 72 extend from the rear sidewall 33 to the front sidewall of the middle enclosure section 20. The baffle plates 72 are laterally spaced to form inlet openings 74 and outlet openings 76 at the bottom and top of the baffle plates. The baffle plates forming a baffle array with the major portion of the baffle plates 72 being inclined and generally at right angles to the flow of air 80 leaving the vortex air flow path 70 and moving upwardly through the middle section 20 of the separator and into the upper filter bag section 18. With the particles carried by the air impinging at right angles onto the baffle plates, the impact causes the particles to bounce off the baffle plates and fall by gravity down into the bottom of the hopper section 22 against the closed hopper gate 24. By this time, all of the larger particles have been removed from the air stream and only micron size particles remain, which pass upwardly from the separator section 20 into the upper separator section 18.

The upper separator section 18 is characterized by the utilization of a replaceable, removable filter bag assembly indicated generally at 82. In this respect, pairs of oppositely directed metal angle strips 84 and 86 are provided on opposed enclosure walls 31 and 35 and rear wall 33 forming a narrow slot or trackway 88 therebetween, the trackways 88 receive opposed edges of lower filter bag support plate indicated generally at 90. An upper plate 81 corresponds to plate 90. Plate 90 has a raised central portion 92 and lip 94 at the edges which is received within slots 88 as the plate is slid laterally inwardly through the open doors 34 when installing the filter assembly 82. The make-up and sliding nature of the filter assembly 82 and the manner in which it fits within the upper enclosure may be seen by further reference to FIGS. 3 and 4.

The lower plate 90 carries nine circular holes or openings at 96 defined by integral, upstanding collars 98, the openings 96 comprising three rows with three openings in each row. Tubular filter bags 100 have their lower ends concentrically surrounding the upstanding collars 98 and are frictionally clamped to the collars by clamping rings 102 whose ends are flanged at 104 and the clamping force is exerted on the lower end of the tubular filter bag by a nut and bolt arrangement as at 106. The lower surface of upper plate 81 is provided with circular collars 99 identically sized and positioned to respective collars 98; plate 81 not being apertured internally of the collars as is plate 90. Clamping rings 101 clamp the upper end of bags 100 to the collars on plate 81. A plurality of threaded rods 108 extend upwardly from the lower plate 90 adjacent the four corners and being mounted to that plate by means of nuts 110. Threadably mounted on the threaded rods 108 are tubes or pipes 112 having a length somewhat shorter than the length of the filter bags 100. The pipes or tubes 112 extend upwardly and at their upper ends, are rotatably mounted to upper plate support rods 114.

As best seen in FIG. 6, each pipe 112 which is of a length somewhat less than that of the tubular filter bags 100 receives one end of the threaded rod 108, the rod 108 being welded to the pipe 112 as at 111. The lower end of each rod 108 extends through the lower plate 90, being inserted within hole 107. By the use of nuts 109 and 110 and washers 113, the pipes 112 may be raised or lowered with respect to the lower plate 90 to tension the tubular filter bags 100. In this respect, the upper end of the threaded support tube or pipe 112 fixedly carries a short threaded rod 116 which extends through an opening 115 within the top of the upper plate support bar 114 with nut 118 and washer 120 rotatably mounting the upper end of the pipe 112 to bar 114 at each of the four corners of the assembly.

Referring next to FIG. 5, each support bar 114 is provided with a pair of resilient damping material elements or cones 126 for mounting to the upper plate 81. In this respect, aligned openings 122 and 124 within upper plate 1 and bar 114 receive bolt 128 which also passes through frustoconical damping material cone 126 and upper and lower plates 132 and 134 to which the top and bottom surfaces of the dampening cones are respectively adhesively affixed, the bolt carrying nut 130.

Thus, the upper plate 1 is held at four points to dual underlying support bars 114, permitting the upper plate to oscillate in a desired manner.

Oscillation is achieved by an electromagnetic vibrator 136 which is mounted by rivets 138 at its four corners to upper plate 1 at the center thereof. The vibrator is a conventional electromagnetic vibrator marketed under the trademark "SYNTRON", which as shown in FIG. 7 is electrically connected to a source of voltage 140 by leads 142 which are connected to the vibrator 136 through a conventional timer 144. The electromagnetic vibrator or transducer sets up a flow pattern of powerful mechanical pulses in wave form causing oscillation of the upper plate 1 which are transmitted by way of the upper plate collars and clamping ring 101 to the tubular filter bag 100, causing the micron size particles which are deposited by the air stream passing radially through the tubular bags into the spaces 103 between the bags to be dislodged from the interior surfaces of the bags and to fall by gravity action back down through the spaces between the baffles 72 of the baffle array and depositing on the hopper gate 24. Timer operation of the vibrator 136 is set so that vibration and dislodgement of the micron sized particles occurs when the blower motor 38 is de-energized so that the normal flow of air within the separator does not act adversely to the vibratory dislodging of the particles from the interior surfaces of the filter bags and gravity deposition from the upper section through the middle section and into the lower hopper section of the separator.

From the above, it may be seen that in operation contaminated air which enters the contour inlet 54, in a downward flow into the separator, effects at this entrance into the middle section of the separator, controlled flow to the hopper section where cyclonic action takes place for centrifugal removal of a great deal of the particulate matter along with gravity deposition due to the ten to one drop in velocity of the air flow within the middle section. The less dense particles which remain in suspension continue to follow the air flow upwardly impinging upon the baffle array which is strategically located to provide an attack angle of approximately 90° to air flow to thus provide an impingement barrier further reducing particle energy and creating additional fallout by direct impingement and gravity action.

Final fabric filtration removes particles of micron size that have been maintained suspended for a sufficient time period permitting them to reach the third, upper separator section. Depending upon the porosity of the tubular filter bags, the flow rate and the type of particle contamination of the air, air may be discharged at the upper end of the separator which is 99.9% clean.

The separator of the present invention has application for removing particulate matter in liquid form such as normally sticky material comprising glue and resin, solid particulate matter of an abrasive nature such as sand, perlite and filing, and chemically corrosive materials such as sulphur and the like. The particle separator of the present invention facilitates a full range of performance by way of its modular construction, permitting performance of 500 CFM to 22,000 CFM at static pressure from 3 inches to 16 inches (water) without design modification and permits heated or conditioned air, if desired, to be recirculated indoors and permits work area cleanliness to meet clean air standards because of high filtration efficiency resulting from the assimilation of four different separation techniques in a simple compact apparatus. The separator of the present invention eliminated the necessity for compressors, nozzles, cylonoids and valving for bag cleaning, has restricted moving parts, concentrates separation in a simple mechanical device which can be employed in a highly automated system and has the blowers mounted on the clean air side to eliminate the risk of damage from deposits of foreign materials or particle impact.

While the invention has been particularly shown and described with reference to a preferred embodiment thereof, it will be understood by those skilled in the art that various changes in form and details may be made therein without departing from the spirit and scope of the invention.

What is claimed is:

1. An improved, multi-action particle separator for separating air suspended particles comprising:
   an elongated, vertically oriented sheet metal enclosure, said enclosure being rectangular in horizontal cross section, said enclosure comprising interconnected upper, middle and lower sections,
   said lower section being in the form of an inverted frusto-pyramid defined by four edge connected, inclined sidewalls,
   a cover overlying the top of said enclosure,
   a horizontal gate closing off the bottom of said lower section,
   an inclined inlet duct fixed to the side of the middle section of said enclosure at the top thereof and opening into said enclosure, said inlet duct being inclined such that inlet air and suspended particles moving through said inlet duct directly impact the inclined sidewall of said enclosure lower section on the side of the enclosure opposite that carrying said inclined inlet duct and effect in conjunction with an oppositely inclined sidewall of said inverted frusto-pyramid lower section to separate particles from the inlet air by centrifugal force,
   a plurality of laterally spaced baffle plates spanning the top of said middle section, said baffle plates being inclined generally parallel to the axis of the inlet duct and generally at right angles to air flow moving by vortex action from the lower section into the middle section and through said baffle plates into the upper section of said enclosure and to thereby impact the inlet air entering the middle section from said inlet duct prior to striking said laterally spaced baffle plates,
   one of said baffle plates being of extended length and being fixed to the side and within the enclosure and being in line with the upper wall of the inlet duct and acting as an extension thereof to further direct the inlet air and suspendced particles through said middle section for direct impact against the inclined sidewall of the inverted frust-pyramid lower section,
   a plurality of vertical, laterally spaced tubular filter bags mounted within the upper enclosure section and being open interiorly to the middle separator section above said baffle plates and being closed off at their upper ends,
   means within said upper enclosure section for carrying said plurality of filter bags such that air is forced to flow into the interior of the filter bags,
   a separator air discharge duct mounted on the cover and open to the space between the tubular filter bags, and
   blower means for inducing air flow from said inlet duct through said enclosure and out said discharge duct;
   whereby, particle separation is effected by gravity due to air velocity decrease in said middle section, centrifugal force as a result of vortex action within said lower section, particle impingement between inlet air particles and suspended particles within the air stream moving upwardly from the lower section through said middle section and into the upper section, particle impingement within said middle section by impact with said baffle plates and dust bag filtering of the smaller sized particles within the upper section prior to relatively clean air discharge at the top of the upper section.

2. The separator as claimed in claim 1, wherein said upper enclosure section includes access door means on one side thereof to permit access to the interior of that section, said means for carrying said filter bags comprising a replaceable filter bag assembly, said section includes means mounted interiorly of said enclosure defining a horizontal trackway, said trackway slidably receiving said filter bag assembly, and said assembly comprising upper and lower plates, circular collars carried by respective plates on facing sides, said lower plates having circular openings within the collars, said tubular filter bags having respective ends concentrically mounted on said collars of the respective upper and lower plates, ring clamps concentrically surrounding the ends of said filter bags and clamping the ends of said filter bags to respective collars, and means for adjustably spacing one plate with respect to the other to tension said filter bags fixed at respective ends to said collars.

3. The separator as claimed in claim 2, wherein said tensioning means comprises threaded rods mounted to one of said plates at its respective corners and extending through holes within said other plate and nuts carried by said threaded rods on opposed sides of said other plate receiving the ends of said rods, whereby rotation of said rods axially displaces said threaded rods relative to said plates with said nuts acting to lock said rods in filter bag tensioned position.

4. The separator as claimed in claim 3, wherein said means defining a horizontal trackway includes oppositely directed paired angle irons mounted on opposite interior walls of said upper enclosure section to form paired trackways, and said trackways receive opposed edges of one of said plates to slidably mount said filter bag assembly within the upper enclosure section for removal through said access door means.

5. The separator as claimed in claim 4, wherein said tensioning means further comprises pipes mounted respectively to said threaded rods at respective corners of said lower plate and extending upwardly therefrom, a pair of upper plate support bars coupled to given pipes on opposite sides of said assembly and resilient damping elements mounting said upper plate to respective support bars, and wherein electromechanical vibrator means is mounted to said upper plate to effect oscillation of said upper plate relative to said lower plate through said damping elements to cause vibration of said tensioned tubular filter bags and dislodgement of particulate matter deposited on the inner surface of said bags for gravity fall from said upper section through said middle section into said lower section.

6. The separator as claimed in claim 5, wherein said damping elements comprise frustoconical resilient material cones bolted between said upper plate and said support bars.

7. The particle separator as claimed in claim 6, wherein said vibrator comprises an electromechanical vibrator and is connected to a source of electrical energy through a timer; whereby, periodic energization permits periodic cleaning of the tubular filter bags upon shut down of the blower.

* * * * *